(12) United States Patent
Li et al.

(10) Patent No.: US 8,909,808 B2
(45) Date of Patent: Dec. 9, 2014

(54) REDUNDANCY ELIMINATION FOR WEB CACHING

(75) Inventors: Dan Li, Sunnyvale, CA (US); Mahesh Viveganandhan, Cupertino, CA (US); Dipak Punnoran Koroth, Fremont, CA (US); Ming Tan, San Jose, CA (US); Martin Ostrowski, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 236 days.

(21) Appl. No.: 13/552,696

(22) Filed: Jul. 19, 2012

(65) Prior Publication Data

US 2014/0025841 A1    Jan. 23, 2014

(51) Int. Cl.
*G06F 15/16*    (2006.01)
(52) U.S. Cl.
USPC ............................ 709/232; 709/223; 709/226
(58) Field of Classification Search
CPC ............................ H04L 67/02; H04L 67/2842
USPC .......................................... 709/232, 223, 226
See application file for complete search history.

(56) References Cited

U.S. PATENT DOCUMENTS

| | | | | |
|---|---|---|---|---|
| 6,453,319 | B1 * | 9/2002 | Mattis et al. | 1/1 |
| 7,062,570 | B2 * | 6/2006 | Hong et al. | 709/238 |
| 2004/0111492 | A1 * | 6/2004 | Nakahara et al. | 709/219 |
| 2009/0271527 | A1 * | 10/2009 | Appelman | 709/247 |
| 2012/0284356 | A1 * | 11/2012 | Luna | 709/213 |

OTHER PUBLICATIONS

R. Fielding et al., "Hypertext Transfer Protocol—HTTP/1.1", Copyright © The Internet Society, Jun. 1999, 165 pgs.
R. Rivest, "The MD5 Message-Digest Algorithm", MIT Laboratory for Computer Science and RSA Data Security, Inc., Apr. 1992, 21 pgs.

* cited by examiner

*Primary Examiner* — Nicholas Taylor
(74) *Attorney, Agent, or Firm* — Merchant & Gould (57) ABSTRACT

In one embodiment, redundancy elimination for web caching may be provided. Upon receiving a request for a content object, a determination of whether the content object is cached may be made. In response to determining that the content object is not cached, the requested content object may be retrieved and, if the content object is associated with an aggregate popularity exceeding a caching threshold, the content object may be cached before providing the requested content object.

24 Claims, 5 Drawing Sheets

REDUNDANCY ELIMINATION FOR WEB CACHING

BACKGROUND

Today's Internet traffic profiles show a large percentage of OTT (over-the-top) media traffic from media content providers such as video streaming sites. While the content is distributed geographically, either through their own, or third-party CDNs (Content Delivery Networks), it often ends up consuming a lot of bandwidth in customer facing Internet Service Provider (ISP) networks, both internally and at peering points. Such bandwidth consumption greatly increases transit costs as well as impacting the customer experience. Furthermore, OTT traffic is difficult to cache because the ISPs don't have explicit relationships with the OTT content providers. In addition, the OTT content often has special HTTP properties that make it non-cacheable in the traditional sense, such as the inability to uniquely identify cacheable objects through their uniform resource locators (URLs).

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Consistent with embodiments of the present disclosure, systems and methods are disclosed for redundancy elimination in web caching.

In one embodiment, redundancy elimination for web caching may be provided. Upon receiving a request for a content object, a determination of whether the content object is cached may be made. In response to determining that the content object is not cached, the requested content object may be retrieved and, if the content object is associated with an aggregate popularity exceeding a caching threshold, the content object may be cached before providing the requested content object.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In the fields of broadcasting and content delivery, over-the-top content (OTT) means on-line delivery of video and audio without the Internet service provider being involved in the control or distribution of the content itself. The provider may be aware of the contents of the IP packets, but is not responsible for, nor able to control, the viewing abilities, copyrights, and/or other redistribution of the content. This is in contrast to delivery through purchase or rental of video or audio content from the Internet provider, such as pay-per-view/video on demand. OTT in particular refers to content that arrives from a third party (e.g., Netflix, Hulu, etc.) and arrives to the end user device, leaving the Internet provider responsible only for transporting IP packets. Consumers can access OTT content through Internet-connected devices such as PCs, laptops, tablets, set top boxes and gaming consoles such as the PlayStation 3 and Xbox 360.

For such OTT content, the Uniform Resource Locator (URL) is no longer the unique identifier of the content; multiple URLs can point to the same content object. This breaks traditional web caching and results in very low cache-hit ratio. Herein, a redundancy elimination may be provided to uniquely identify a web object, based on its actual content and metadata.

Whenever a web object passes through a transparent proxy caching (TPC) engine, a fingerprint (e.g., an md5 hash) may be calculated over the content payload of an HTTP response and/or selected HTTP headers. The fingerprint may be generated from the entire payload, or some portions of it. This fingerprint is unique to this web object and is much smaller than the object itself. The TPC Engine may save the fingerprint in a content manager database, along with the object's URL and/or HTTP headers, as part of the object's metadata record. The TPC Engine may also makes a "cacheability" determination based on the HTTP headers of the object and the HTTP/1.1 standards definition and this determination may also be stored in the metadata record.

Two fields may be stored: whether the object is cacheable and, if so, for how long before revalidation is required. Initially, the object itself may not be stored. Over time, the TPC Engine builds up a content manager database with numerous objects' metadata records. Once these objects have met an aggregate popularity based caching threshold, their actual content may be saved in a local cache storage.

While the OTT content provider may use many URLs to serve up the same content, a redundancy elimination scheme is able to automatically spot the commonality of the data and store a single object, identified through multiple URLs. In some cases, a URL may contain fields that are unique for every client (e.g. the client source IP address). For these cases, an offline matching algorithm may be used to extract a general mapping from a group of URLs having a particular pattern. The result of the offline matching algorithm would be a regular expression matching all URLs that identify a particular object but excludes all non-matching URLs. The Content Manager record may then replace all the stored URLs for the object with the matching regular expression and incoming URLs would be matched against the expression rather than searching for an exact match from the list of URLs.

Figure 1:
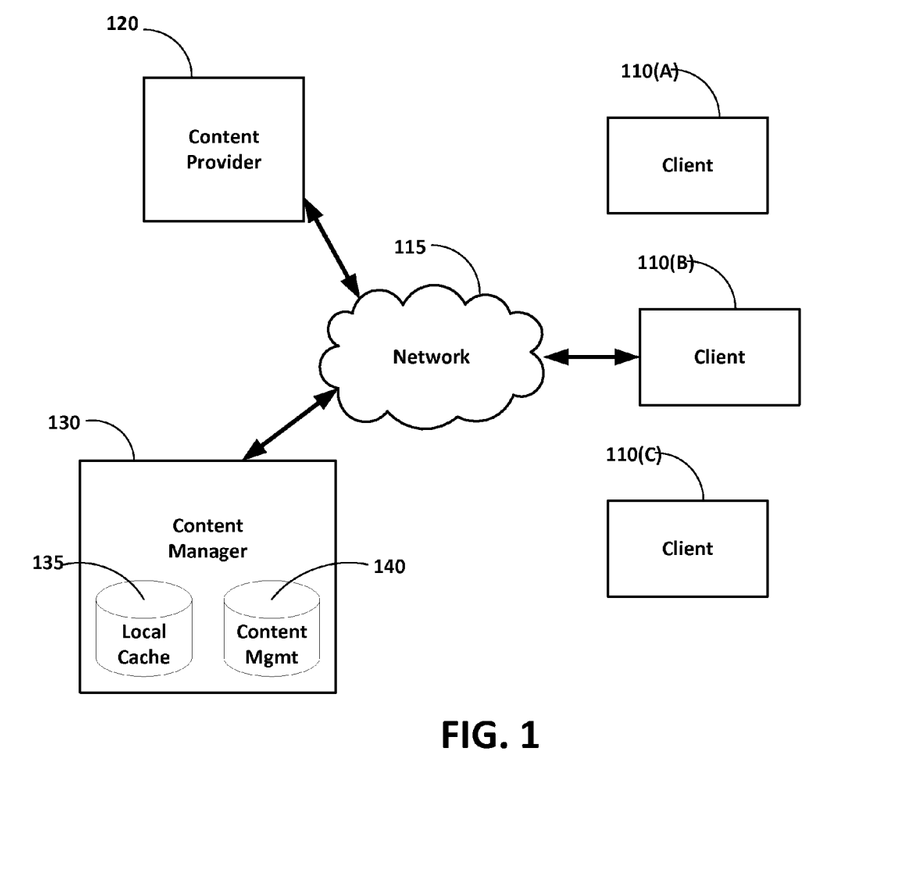
FIG. 1 is a block diagram of an operating environment.

FIG. 1 is a block diagram view of an operating environment 100 for providing redundancy elimination in web caching.

Operating environment 100 may comprise a plurality of clients 110(A)-(C) in communication via a network 115 with a content provider 120 and a content manager 130. Content manager 130 may comprise a local cache 135 and a content management database 140. Clients 110(A)-(C) may comprise content consuming devices such as computers, cable set-top boxes, mobile devices, laptops, cellular phones, tablets, etc. Network 115 may comprise, for example, a public network such as the Internet, a wired network, a wireless network, a cellular network, and/or a service provider (i.e., cable television and/or satellite) network.

Figure 2:
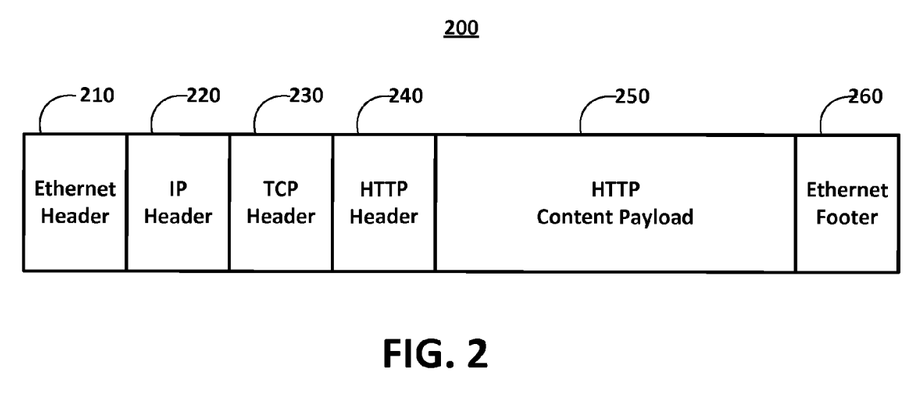
FIG. 2 is a block diagram of a data packet.

FIG. 2 is a block diagram of a data packet 200. Data packet 200 may comprise a plurality of segments such as an Ethernet header 210, an Internet Protocol (IP) header 220, a Transmission Control Protocol header 230, a Hypertext Transport Protocol (HTTP) header 240, a Hypertext Transport Protocol (HTTP) content payload 250, and an Ethernet footer 260. The header segments of data packet 200 may comprise information regarding sender and destination addresses and ports, sizes, versions, packet length, checksums, sequence numbers, flags, etc. For example, IP header 220 may comprise a TTL value representing a number of hops the packet may traverse before being dropped. HTTP header 250 may comprise information about the content of HTTP content payload 250, such as cache-control instructions, in accordance with the RFC 2616 standard for HTTP/1.1. Data packet 200 may be transmitted among the various elements depicted in operating environment 100 via network 115.

Figure 3A:
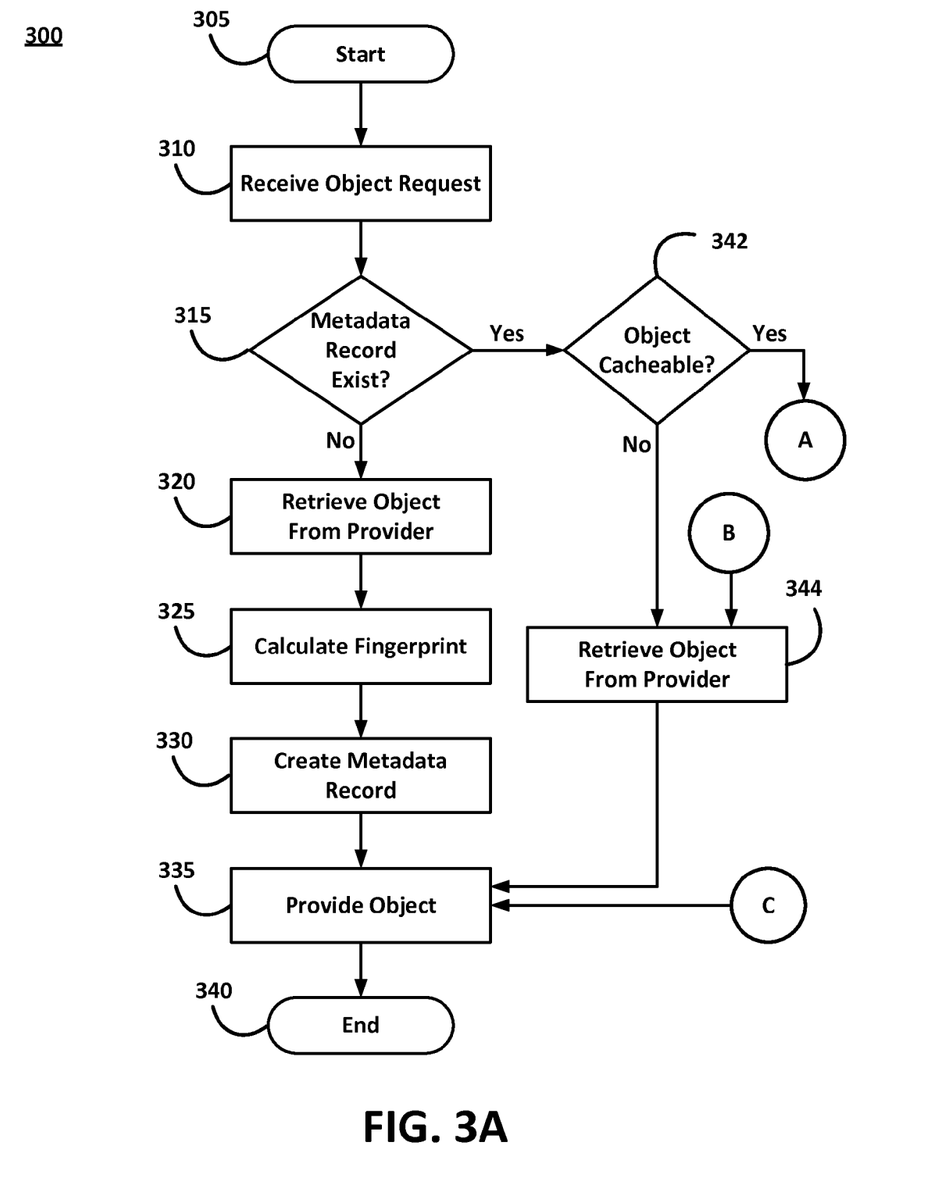
FIGS. 3A-3B are flow charts illustrating a method for providing web caching.
Figure 3B:
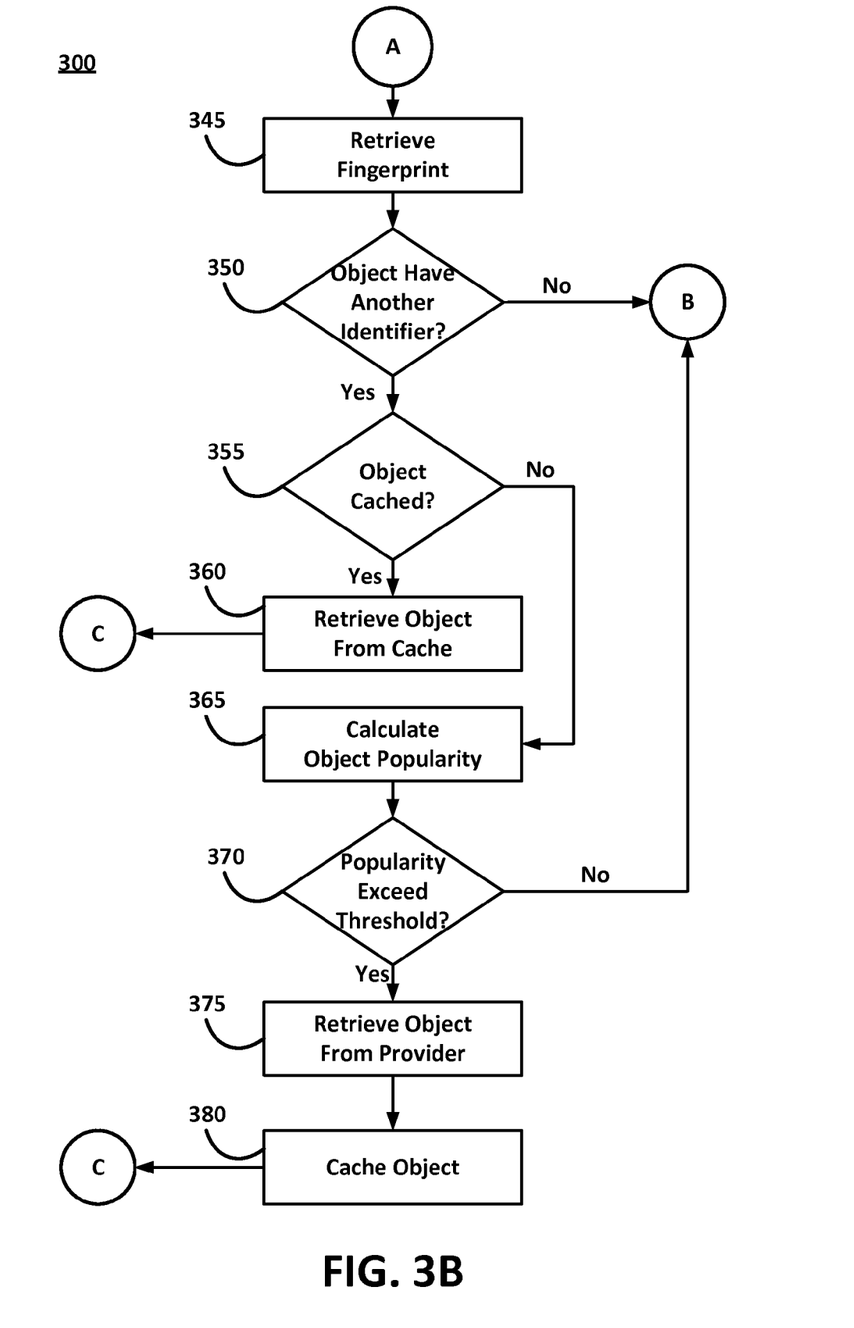

FIGS. 3A-3B illustrate a flow chart setting forth the general stages involved in a method 300 consistent with an embodiment of the disclosure for providing redundancy elimination in web caching. Method 300 may be implemented using the components illustrated in operating environment 100 as described above. Ways to implement the stages of method 300 will be described in greater detail below. Method 300 may begin at starting block 305 and proceed to stage 310 where computing device 400 may receive a request for a content object. For example, client device 110(A) may transmit a request to content provider 120 via network 115. Content manager 130, which may be associated with an Internet Service Provider (ISP) providing network access to client device 110(A), may receive the request. Content objects may comprise web objects such as downloadable files, videos, images, web pages, etc.

Method 300 may then advance to stage 315 where computing device 400 may determine whether a metadata record associated with the requested content object exists. For example, content management database 140 may comprise a plurality of metadata records associated with a plurality of content objects, at least some of which may be cached in local cache 135. The metadata record may be indexed by an identifier associated with the content object, such as the object's URL.

If no metadata record is found, method 300 may advance to stage 320 where computing device 300 may retrieve the content object from a content provider. For example, content manager 130 may download the requested content object from content provider 120 as one and/or a plurality of HTTP data packets such as data packet 200.

Method 300 may then advance to stage 325 where computing device 300 may calculate a fingerprint for the content object. For example, content manager 130 may calculate an MD5 hash over the object's 'Request Response' HTTP header field and/or at least a portion of the HTTP content payload of the data object. The MD5 Algorithm is a widely used cryptographic hash function that produces a 128-bit (16-byte) hash value as specified in RFC 1321. An MD5 hash is typically expressed as a 32-digit hexadecimal number.

Method 300 may then advance to stage 330 where computing device 400 may create a metadata record for the content object. The metadata record may comprise information such as the fingerprint, the URL for the content object, a cacheability score, some and/or all of the HTTP headers associated with the content object, and a calculated revalidation time. The cacheability score may be based on the HTTP headers of the object and the HTTP RFC standards definition. Content manager 130 may use copyright information in the headers to determine whether caching of the object is permitted. Content manager 130 may also be operable to learn heuristic rules for some content, such as lowering the cacheability score for live event video content.

Method 300 may then advance to stage 335 where computing device 400 may make the requested content available. For example, content manager 130 may transmit the content object via network 115 to the requestor, such as client device 110(A). After providing the object to the requestor at stage 335, method 300 may end at stage 340

If a metadata record is located at stage 315, method 300 may instead advance to stage 342 where computing device 400 may determine whether the requested object is cacheable. For example, the cacheability score in the metadata record may be below a cacheability threshold (such as for the above mentioned live event video data) or a revalidation time for the object may have passed.

If the object is not cacheable, method 300 may advance to stage 344 where computing device 400 may retrieve the content object from the content provider as described above with respect to stage 320 and proceed to provide the content object at stage 335. Otherwise, method 300 may advance to stage 345 where computing device 400 may retrieve the fingerprint and/or other data associated with the content object. For example, content manager 130 may retrieve the object's metadata record from content manager database 140.

Method 300 may then advance to stage 350 where computing device 400 may determine whether other objects are associated with the same fingerprint. For example, content manager 130 may determine whether other objects in content manager database 140 comprise the same fingerprint but different URLs. If not, method 300 may return to stage 344 as described above.

If the object is found to be associated with another identifier (e.g., multiple URLs point to the requested object), method 300 may advance to stage 355 where computing device 400 may determine whether the requested object is already cached. For example, content manager 130 may scan local cache 135 to determine if the requested object is cached therein.

If so, method 300 may advance to stage 360 where computing device 400 may retrieve the object from the cache. Method 300 may then return to stage 335 and make the requested object available, as described above.

If the object is not already cached, method 300 may advance to stage 365 where computing device 400 may calculate an aggregate popularity for the content object. The aggregate popularity may comprise a measure of the number of times a particular content object has been requested across a plurality of users. For example, content manager 130 may increment a counter for each request for the content object by a different client.

Method 300 may then advance to stage 370 where computing device 400 may determine whether the aggregate popularity of the object across all identifiers exceeds a caching threshold amount. For example, a content manager 130 may be associated with 1000 subscribers and may have a caching threshold of 1%, such that after ten subscriber client devices requested a given object, the aggregate popularity of that object would exceed the cache threshold. Such a value may be configurable and/or dynamic. For example, the caching threshold may be weighted such that a threshold number may be reduced if requests for the object are received in a short period of time.

If the aggregate popularity does not exceed the threshold value, method 300 may return to stage 344, as described above. Otherwise, method 300 may advance to stage 375 where computing device 400 may retrieve the content object from the content provider, as described above with respect to stage 320.

Method 300 may then proceed to stage 380 where computing device 400 may cache the content object. For example, content manager 130 may store a copy of the content object in local cache 135. Method 300 may then return to stage 335 to provide the content object to the requestor before ending at stage 340.

Figure 4:
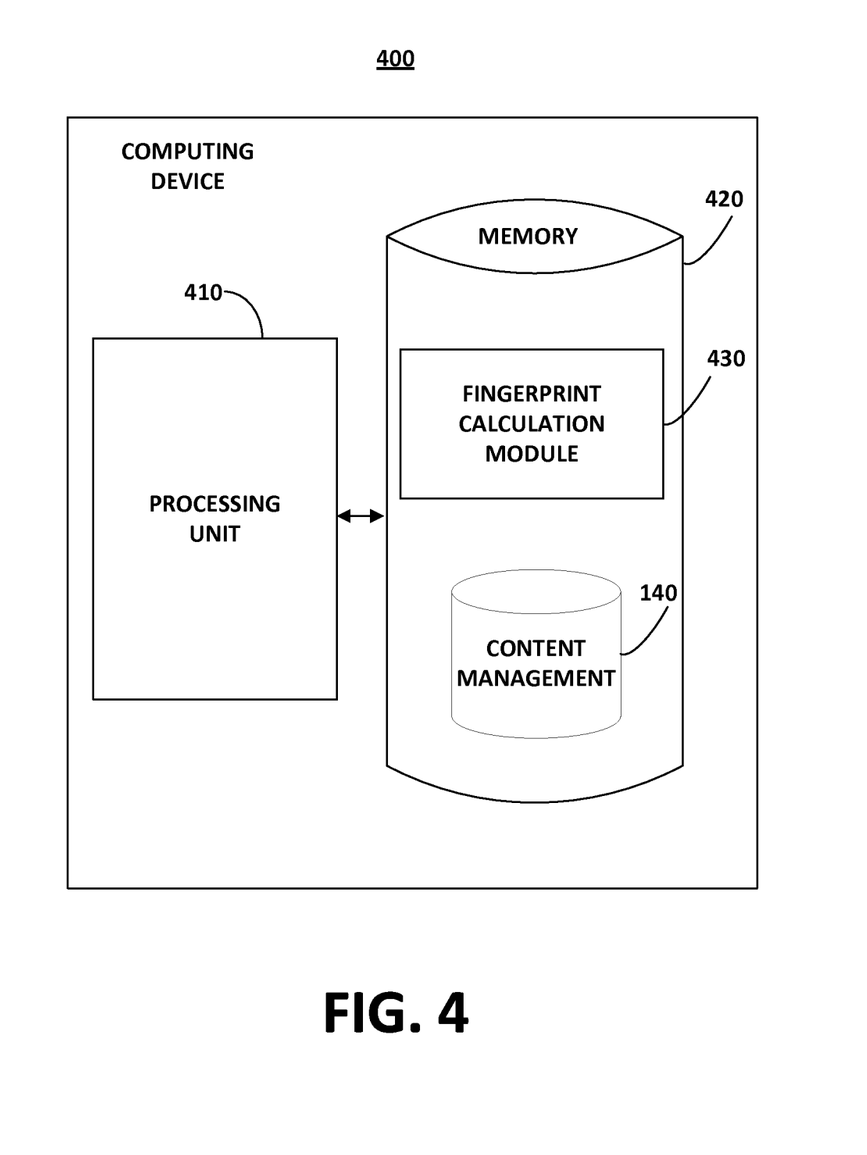
FIG. 4 is a block diagram illustrating components of a computing device.

FIG. 4 illustrates computing device 400 comprising a processing unit 410 and a memory unit 420. Memory 420 may include a fingerprint calculation module 430 and content management database 140. While executing on processing unit 410, these and other software modules and/or data sources may perform processes for providing redundancy elimination in web caching, for example, via one or more stages included in method 300 described above with respect to FIGS. 3A-3B. Moreover, any one or more of the stages included in method 300 may be performed on any element shown in operating environment 100 and each of the elements illustrated in operating environment 100 may comprise a similar computing device to that illustrated by FIG. 4.

Computing device 400 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a request for a content object;
   determining whether the content object is cached;
   in response to determining that the content object is not cached:
      retrieving the requested content object;
      determining whether a metadata record associated with the content object exists in a content manager database,
      updating, in response to determining that the metadata record exists in the content manager database, a cacheability score associated with the content object,
      determining a revalidation time associated with the cacheability score from the metadata record,
      determining whether the content object is associated with an aggregate popularity exceeding a caching threshold, wherein determining whether the content object is associated with the aggregate popularity exceeding the caching threshold comprises determining that the cacheabilty score is within the revalidation time and exceeds the caching threshold, and
      in response to determining that the content object is associated with an aggregate popularity exceeding the caching threshold, caching the content object; and
   providing the requested content object.

2. The method of claim 1, wherein determining whether a metadata record associated with the content object exists in a content manager database comprises:
   calculating a fingerprint for the requested content object, wherein the requested content object comprises at least one header segment and a payload segment; and
   determining whether the fingerprint exists in a metadata record in a content manager data base.

3. The method of claim 2, further comprising, in response to determining that the fingerprint exists as the metadata record in the content manager data base:
   calculating an aggregate popularity of the content object according to a count of a plurality of identifiers associated with the content object in the metadata record;
   determining whether the aggregate popularity of the content object exceeds the caching threshold; and
   in response to determining that the aggregate popularity of the content object exceeds the caching threshold, caching a plurality of content data associated with the content object.

4. The method of claim 3, wherein each of the plurality of identifiers comprise a Uniform Resource Locator (URL) associated with the content object.

5. The method of claim 2, wherein calculating the fingerprint comprises calculating an md5 hash of at least one of the following: at least one packet header associated with the content object and at least a portion of a packet content payload associated with the content object.

6. The method of claim 1, wherein updating the cacheability score comprises calculating the cacheability score for the content object.

7. The method of claim 6, wherein the cacheability score is calculated according to at least one of the following: a heuristic rule, a value associated with at least one packet header associated with the content object and a requirement imposed by a standard associated with network transmission of the content object.

8. The method of claim 6, further comprising calculating the revalidation time associated with the content object according to at least one of the following: the cacheability score and at least one packet header associated with the content object.

9. The method of claim 1, further comprising storing the updated cacheability score in the metadata record.

10. A system comprising:
a memory storage; and
a processor coupled to the memory storage, the processor operative to:
receive a request for a content object;
determine whether an identifier associated with the content object is associated with a metadata record in the memory storage,
in response to determining that the identifier associated with the content object is associated with the metadata record in the memory storage, determine whether a cacheability score in the metadata record indicates that the content object is cacheable, wherein determining that the cacheability score indicates that the content object is cacheable comprises determining that the cacheability score is within a validation time in the metadata record and exceeds a caching threshold,
in response to determining that the cacheability score in the metadata record indicates that the content object is cacheable:
retrieve a fingerprint associated with the content object from the metadata record;
determine whether at least one second identifier is associated with the fingerprint associated with the content object;
in response to determining that the at least one second identifier is associated with the fingerprint associated with the content object, determine whether the content object is already cached in the memory storage; and
in response to determining that the content object is not already cached in the memory storage:
calculate an aggregate popularity for the content object,
determine whether the aggregate popularity of the content object exceeds a threshold value, and
in response to determining that the aggregate popularity of the content object exceeds a threshold value, cache a copy of the content object retrieved from a content provider in the memory storage.

11. The system of claim 10, wherein the identifier and the at least one second identifier each comprise a Uniform Resource Locator (URL).

12. The system of claim 10, wherein the processing unit is further operable to, in response to determining that the identifier associated with the content object is not associated with the metadata record in the memory storage:
retrieve the content object from the content provider;
calculate an md5 hash of at least a portion of the content object;
create the metadata record in the memory storage, wherein the metadata record comprises the identifier associated with the content object and the md5 hash as the fingerprint; and
provide the requested content object.

13. The system of claim 12, wherein the at least a portion of the content object comprises at least one of the following: at least one packet header associated with the content object and at least a portion of a packet content payload associated with the content object.

14. The system of claim 10, wherein the processing unit is further operable to, in response to determining that the cacheability score in the metadata record indicates that the content object is cacheable:
retrieve the content object from the content provider; and
provide the requested content object.

15. The system of claim 10, wherein the processing unit is further operable to, in response to determining that the content object is already cached:
retrieve the requested content object from the cache; and
provide the requested content object.

16. The system of claim 10, wherein the processing unit is further operable to, in response to determining that the aggregate popularity of the content object exceeds the threshold value:
calculate a revalidation time for the content object according to at least one of the following: the cacheability score, at least one packet header associated with the content object, a heuristic rule, a value associated with at least one packet header associated with the content object, and a requirement imposed by a standard associated with network transmission of the content object; and
store the revalidation time for the content object in the metadata record associated with the content object.

17. Software encoded on at least one non-transitory computer-readable media and when executed operable to:
receive a request for a content object;
determine whether a metadata record associated with the content object exists in a content manager database according to a first uniform resource locator (URL) associated with the requested content object;
in response to determining that the metadata record associated with the content object exists in the content manager database, determine whether the content object is associated with at least one second URL according to a fingerprint stored in the metadata record;
in response to determining that the content object is associated with the at least one second URL, determine whether a copy of the content object exists in a cache;
in response to determining that the copy of the content object exists in the cache, provide the content object from the cache;
updating a cacheability score associated with the content object in the metadata record;
determining a revalidation time associated with the cacheability score from the metadata record; and
revalidating, in response to the cacheability score not within the revalidation time, the cacheability score.

18. The software of claim 17, further operable to, in response to determining that the metadata record associated with the content object does not exist in the content manager database:
retrieve the content object;
calculate a fingerprint for the content object;

identify the cacheability score associated with the content object; and create a new metadata record associated with the content object comprising the calculated fingerprint and at least one of the following: a uniform resource locator (URL) associated with the content object, the cacheability score associated with the content object, at least one packet header associated with the content object, and at least a portion of a packet content payload associated with the content object.

19. The software of claim 18, wherein the cacheability score is identified according to at least one packet header associated with the content object and the revalidation time of the content object.

20. The software of claim 18, further operable to calculate the fingerprint for the content object according to at least one of the following: at least one packet header associated with the content object and at least a portion of a packet content payload associated with the content object.

21. An apparatus comprising:

a memory storage; and a processor coupled to the memory storage, the processor being configured to:

calculate a fingerprint for a content object according to at least a portion of the content object;

determine whether a copy of the content object is stored in the memory storage according to the computed fingerprint, and in response to determining that the content object is not stored in the memory storage:

determine whether a metadata record associated with the content object exists in a content manager database, determine, in response to determining that the metadata record exists, a cacheability score comprising an aggregate popularity for the content object from the metadata records;

determine a revalidation time associated with the cacheability score from the metadata record, update the cacheability score associated with the content object, determine whether the updated cacheability score exceeds a caching threshold and is within the revalidation time, and in response to determining that the updated cacheability score exceeds the caching threshold, caching the content object in the memory storage.

22. The apparatus of claim 21, wherein the caching threshold comprises a dynamic value.

23. The apparatus of claim 21, wherein the processor being configured to calculate the fingerprint for a content object according to at least a portion of the content object comprises the processor being configured to calculate an md5 hash of the at least a portion of the content object.

24. The apparatus of claim 21, wherein the at least a portion of the content object comprises at least one of the following: at least one packet header associated with the content object and at least a portion of a packet content payload associated with the content object.

* * * * *